US012755989B2

(12) United States Patent
Pierpont et al.

(10) Patent No.: US 12,755,989 B2
(45) Date of Patent: Oct. 6, 2026

(54) HYBRID HYDROGEN FUEL CELL COMBUSTOR POWER SYSTEM

(71) Applicant: Caterpillar Inc., Peoria, IL (US)

(72) Inventors: David Andrew Pierpont, Dunlap, IL (US); David M. Ginter, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1022 days.

(21) Appl. No.: 18/048,331

(22) Filed: Oct. 20, 2022

(65) Prior Publication Data

US 2024/0136547 A1 Apr. 25, 2024
US 2024/0234755 A9 Jul. 11, 2024

(51) Int. Cl.

*H01M 8/04014* (2016.01)
*H01M 8/04082* (2016.01)
*H01M 8/04111* (2016.01)
*H01M 8/04119* (2016.01)
*H01M 8/04302* (2016.01)
*H01M 8/04537* (2016.01)
(Continued)

(52) U.S. Cl.

CPC .... *H01M 8/04022* (2013.01); *H01M 8/04111* (2013.01); *H01M 8/04126* (2013.01); *H01M 8/04156* (2013.01); *H01M 8/04201* (2013.01); *H01M 8/04302* (2016.02); *H01M 8/04611* (2013.01); *H01M 8/04716* (2013.01); *H01M 8/04776* (2013.01); *F02B 43/10* (2013.01)

(58) Field of Classification Search

CPC ......... H01M 8/04022; H01M 8/04111; H01M 8/04716; H01M 8/04302; H01M 8/04126; H01M 8/04156; H01M 8/04201; H01M 8/04925; H01M 8/04604; H01M 8/04776

See application file for complete search history.

(56) References Cited

U.S. PATENT DOCUMENTS 5,968,680 A 10/1999 Wolfe et al.
7,097,925 B2 8/2006 Keefer
(Continued)

FOREIGN PATENT DOCUMENTS

CN 114976154 A 8/2022
DE 102009036198 B4 3/2013
(Continued)

OTHER PUBLICATIONS

WO2016124575 English translation. Grundei et al. WIPO. Aug. 11, 2016. (Year: 2016).*

(Continued)

*Primary Examiner* — Christopher P Domone
(74) *Attorney, Agent, or Firm* — Lee & Hayes, PLLC

(57) ABSTRACT

A fuel cell electrical power generation system is described herein. The system uses a combustor to increase the pressure and temperature of exhaust gases from a fuel cell stack of the system. The combustor uses hydrogen from a hydrogen supply to provide fuel to the combustor. The increased temperature/pressure of the exhaust gases post combustion are used to rotate a turbine, which in turn rotates a compressor of a turbocharger. The compressor compresses incoming air to increase the power output and/or the efficiency of the system. An ebooster can be used in low load conditions, such as during a startup or during at time in which the electrical loading on the fuel cells is relatively low.

9 Claims, 4 Drawing Sheets

(51) Int. Cl.
*H01M 8/04701* (2016.01)
*H01M 8/04746* (2016.01)
*F02B 43/10* (2006.01)

(56) References Cited

U.S. PATENT DOCUMENTS

| | | | | |
|---|---|---|---|---|
| 7,659,015 | B2 | 2/2010 | Hoffjann et al. | |
| 7,674,539 | B2 | 3/2010 | Keefer et al. | |
| 8,015,808 | B2 | 9/2011 | Keefer et al. | |
| 2008/0110514 | A1* | 5/2008 | Yoshida | H01M 8/04208 137/628 |
| 2019/0088962 | A1* | 3/2019 | Chikugo | H01M 8/04753 |
| 2021/0285364 | A1* | 9/2021 | Lusardi | F02M 26/08 |

FOREIGN PATENT DOCUMENTS

| | | | |
|---|---|---|---|
| DE | 102011120545 | A1 | 6/2013 |
| DE | 102014018444 | A1 | 6/2016 |
| DE | 102017007090 | A1 | 1/2019 |
| JP | 2013161616 | A | 8/2013 |
| WO | WO02057105 | A1 | 7/2002 |
| WO | WO2016124575 | * | 8/2016 |

OTHER PUBLICATIONS

Written Opinion and International Search Report for Int'l. Patent Appln. No. PCT/US2023/074197, mailed Jan. 2, 2024 (11 pgs).

* cited by examiner

HYBRID HYDROGEN FUEL CELL COMBUSTOR POWER SYSTEM

TECHNICAL FIELD

The present disclosure relates to electrical power generation systems. More specifically, the present disclosure relates to combining a hydrogen fuel cell with a hydrogen combustor to increase power capability and reduce cost and heat rejection profile of the power system.

BACKGROUND

As industries electrify, i.e., increasingly use electric-powered equipment and machines, traditional sources of power such as mechanical combustion engines and turbines are being replaced with alternative power generation systems. An example of an alternative power generation system is a hydrogen fuel cell. Fuel cells that use hydrogen and oxygen, or other chemical combinations, to generate electricity via electrochemical reactions can provide significant advantages as power sources over conventional diesel or gas generator sets. For example, fuel cells provide a clean energy source with a smaller carbon footprint. Fuel cells are also longer-lasting, quieter, and more reliable as a backup energy source, as compared with comparable generator sets.

A common type of hydrogen fuel cell technology is the proton exchange membrane (PEM) fuel cell. Generally, in PEM fuel cells, hydrogen fuel is channeled or ported into field flow plates on an anode side, while oxygen (from air) is channeled or ported to the cathode side, which is on the other side of a fuel cell. A catalyst (typically platinum or platinum-based) on the anode side causes the hydrogen to split into positive hydrogen ions (the proton) and negatively charged electrons. The polymer electric membrane between the anode and the cathode allows the protons to pass through it, while forcing the electrons to travel through an electrical circuit to the cathode. This creates an electrical current. At the cathode, the electrons and the protons combine with oxygen to form water, which flows out of the cell. Adding PEM fuel cells (or stacks) increases the voltage available.

To increase the air flow into the PEM fuel cell, an electrical turbo-booster configuration can be used. The compressor of the turbo-booster compresses input air into the PEM fuel cell, increasing the amount of oxygen available for use in the PEM fuel cell, thereby increasing the potential power output of the PEM fuel cell. For example, one approach to this is described in German Publication No. DE102011120545 ("the '545 application"). The '545 application describes a system that uses an electric turbocharger. According to the '545 application, the electric turbocharger is part of the air delivery system and is used to provide compressed air, or in some instances, can use the residual heat of the exhaust to produce additional electrical power. However, when used to compress air for the air delivery system, the electric turbocharger of the '545 application is a parasitic load on the fuel cell system, meaning, that some of the power generated by the fuel cell system is used to power the electric turbocharger, thus reducing the total power output of the fuel cell system. Further, turbocharger systems, including those that use an electric turbocharger like the '545 application, operate using high pressure/temperature exhaust gases.

Examples of the present disclosure are directed to overcoming deficiencies of such systems.

SUMMARY

In a first aspect of the presently disclosed subject matter, a fuel cell system is described. The fuel cell system includes one or more hydrogen fuel cells electrically connected and configured to provide electrical power to an electrical load, a turbocharger comprising a compressor and a turbine, wherein the compressor is configured to compress air into compressed air and the turbine is configured to rotate the compressor to compress the air, an air intake manifold configured to receive the compressed air and introduce the compressed air into a cathode side of the one or more hydrogen fuel cells, a hydrogen intake manifold configured to receive hydrogen from a hydrogen supply and supply the hydrogen to an anode side of the one or more hydrogen fuel cells, an exhaust manifold for receiving exhaust gases at a first temperature and first pressure from the cathode side of the one or more hydrogen fuel cells, and a combustor configured to receive the exhaust gases from the exhaust manifold at the first temperature and first pressure and combust the exhaust gases with combustor hydrogen from the hydrogen supply or an anode exhaust manifold, or both, to increase a pressure and a temperature of the exhaust gases from the first temperature and first pressure to a second temperature and a second pressure, wherein the exhaust gases at the second temperature and the second pressure are fed to the turbine to rotate a shaft connecting the turbine to the compressor.

In a further aspect of the presently disclosed subject matter, a method of operating a fuel cell system having one or more hydrogen fuel cells includes detecting, by a controller, a load condition being a startup load condition or a low load condition, initializing an ebooster, determining, by the controller, that the load condition has increased from the startup load condition or the low load condition to within an operational range of a combustor, and initializing the combustor to combust exhaust gases from one or more hydrogen fuel cells to increase the exhaust gases from a first temperature and a first pressure to a second temperature and a second pressure, wherein the exhaust gases at the second temperature and the second pressure are fed to a turbine to rotate a shaft connecting the turbine to a compressor to compress air.

In a still further aspect of the presently disclosed subject matter, a controller for controlling a combustor in a fuel cell system includes a memory storing computer-executable instructions, and a processor in communication with the memory, the computer-executable instructions causing the processor to perform acts comprising detecting, by a controller, a load condition for one or more hydrogen fuel cells comprises a startup load condition or a low load condition, initializing an ebooster, determining, by the controller, that the load condition has increased from the startup load condition or the low load condition to within an operational range of a combustor; and initializing the combustor to combust hydrogen from a hydrogen supply, hydrogen from an anode exhaust manifold, or a mixture of hydrogen from the hydrogen supply and hydrogen from the anode exhaust manifold and exhaust gases from one or more hydrogen fuel cells to increase a temperature and a pressure of the exhaust gases from a first temperature and a first pressure to a second temperature and a second pressure, wherein the exhaust gases at the second temperature and the second pressure are fed to a turbine to rotate a shaft connecting the turbine to a compressor to compress air.

DETAILED DESCRIPTION

Figure 1:
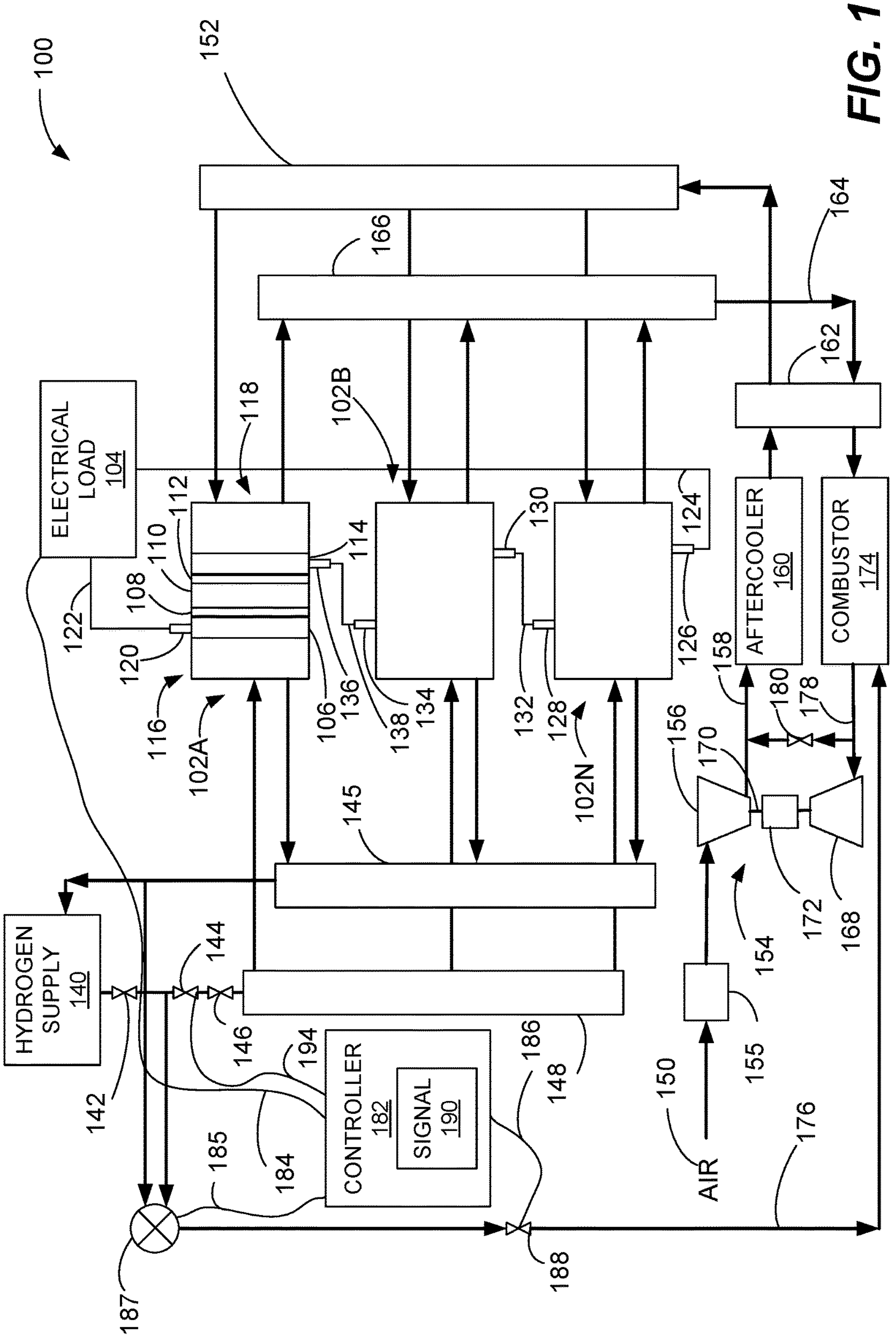
FIG. 1 illustrates a fuel cell system using a combustor, in accordance with one or more examples of the present disclosure.

Wherever possible, the same reference numbers will be used throughout the drawings to refer to the same or like parts. FIG. 1 illustrates a fuel cell system 100, in accordance with one or more examples of the present disclosure. The fuel cell system 100 of FIG. 1 includes fuel cells 102A-102N (referred to hereinafter specifically as "the fuel cell 102A," "the fuel cell 102B," and the like, and generally as "the fuel cells 102"). The fuel cells 102 are used to produce electrical power for an electrical load 104. The electrical load 104 can be one or more components powered by electricity such as, but not limited to, motors for moving a vehicle, computers, air conditioners, screens, and the like. The presently disclosed subject matter is not limited to any particular type of electrical load 104. The fuel cell 102A has an anode gas diffusion layer 106, an anode catalyst 108, a proton exchange membrane 110, a cathode catalyst 112, and a cathode gas diffusion layer 114. For the purposes of simplicity, the internal configurations of the fuel cells 102B and 102N are not illustrated but are functionally the same as the fuel cell 102A. The anode gas diffusion layer 106 and the cathode gas diffusion layer 114 are permeable materials that are typically made of carbon fibers. The anode gas diffusion layer 106 and the cathode gas diffusion layer 114 facilitate the diffusion of the hydrogen gas, on an anode side 116, and air (oxygen) on a cathode side 118 towards their respective catalysts. The anode catalyst 108 and the cathode catalyst 112 are typically constructed of precious metals such as platinum or platinum alloys such as platinum-ruthenium. The anode catalyst 108 and the cathode catalyst 112 accelerate chemical reactions on both the anode side 116 and the cathode side 118, respectively.

The proton exchange membrane 110 allows hydrogen ions (the protons) created on the anode side 116 to permeate through the proton exchange membrane 110 while blocking electrons, forcing the electrons to travel out anode 120, through connector 122 and into the electrical load 104. An electrical connector 124 is connected to the electrical load 104. To provide for an electrical circuit, the electrical connector 124 is electrically connected to a cathode 126 of the fuel cell 102N. An anode 128 of the fuel cell 102N is electrically connected to a cathode 130 of the fuel cell 102B through electrical connector 132. An anode 134 of the fuel cell 102B is electrically connected to a cathode 136 of the fuel cell 102A through electrical connector 138. In this manner, the fuel cells 102 are connected in series. It should be noted that the fuel cells 102 may be connected in other electrical configurations or combinations, all of which are included in the presently disclosed subject matter.

A hydrogen supply 140 provides hydrogen to the fuel cells 102. The hydrogen from the hydrogen supply 140 moves through a hydrogen shutoff valve 142, a hydrogen ejector 144, a pressure regulator valve 146, and into a hydrogen intake manifold 148. The hydrogen shutoff valve 142, when closed, shuts off the hydrogen supply 140 from the system 100, typically in a shutdown or emergency mode. The hydrogen ejector 144 is a throttle valve that feeds the required quantity of hydrogen for the system 100 based on the electrical power needs of the electrical load 104. The pressure regulator valve 146 maintains a proper pressure in the hydrogen intake manifold 148 by increasing or decreasing the flow from the hydrogen ejector 144. Unused hydrogen moves from the fuel cells 102 into a anode exhaust manifold 145, whereby the excess hydrogen is fed back to the hydrogen supply 140.

The fuel cells are provided oxygen from air 150 in the air intake manifold 152. The air intake manifold 152 receives the air 150 through the use of a turbocharger 154. The turbocharger 154 receives the air 150 through a filter 155 that filters the air 150 of particulate prior to entering a compressor 156 of the turbocharger 154. The compressor 156 compresses the air 150 and provides compressed air 158 into an aftercooler 160. The aftercooler 160 cools (or reduces a temperature of) the compressed air 158 to reduce the heat added to the compressed air 158 after being compressed by the compressor 156. The compressed air 158 exits the aftercooler 160 and enters a humidifier 162. The humidifier 162 adds moisture to the cooled, compressed air 158 to increase the efficiency of the fuel cells 102. In FIG. 1, the humidifier 162 is designed to remove moister from an exhaust gas 164 coming from an exhaust gas manifold 166 of the fuel cells 102. It should be noted that moisture can be added in various ways than that which is illustrated in FIG. 1. Continuing with FIG. 1, the cooled, humidified, compressed air 158 leaves the humidifier 162 and enters the air intake manifold 152 for use by the fuel cells 102.

The exhaust gas 164 of the fuel cells 102 exits into the exhaust gas manifold 166. During steady-state or moderate loading from the electrical load 104, the pressure/temperature of the exhaust gas 164 can be high enough to move the blades (not shown) of a turbine 168 of the turbocharger 154. The spinning of the blades of the turbine 168 rotates a shaft 170 connecting the blades of the turbine 168 to compressor blades (not shown) of the compressor 156, thus providing the compression mechanism for the compressor 156 of the incoming air 150. However, in some configurations, such as startup or other low load conditions of the electrical load 104, the pressure/temperature of the exhaust gas 164 may not be high enough to provide the motive force necessary to turn the blades of the turbine 168 at a sufficient speed to cause a desired or needed compression of the air 150.

When the exhaust gas 164 is of insufficient temperature/pressure to provide the needed motive force upon the turbine 168, the system 100 may use an ebooster 172. An ebooster 172 is an electrically powered device that has an internal rotational mechanism that can be used to rotate components (as illustrated by way of example in FIG. 1) or rotate an internal turbine (as illustrated by way of example in FIG. 2) to provide an additional motive force to compress the air 150. In the example illustrated in FIG. 1, the ebooster 172 rotates the shaft 170 of the turbocharger 154, supplementing or augmenting the motive force provided by the exhaust gas 164. When energized, the ebooster 172 rotates the shaft 170, thereby rotating the blades of the compressor 156 to compress the air 150.

In some configurations, a combustor 174 may be used to supplement or augment the motive force provided by the exhaust gas 164. Because the ebooster 172 is powered by the system 100 (i.e., is a parasitic load), in some instances, the use of the ebooster 172 can be efficient during startup or low load conditions, resulting in a lower efficiency during normal operations. In conditions where the use of the ebooster 172 is not desirable, the combustor 174 is used. The combustor 174 is a hydrogen internal combustion engine that combusts hydrogen with oxygen, forming high pressure/temperature exhaust, typically in the form of high-pressure steam, but other types of combustors with varying exhaust gases may be used. In FIG. 1, the combustor 174 receives the exhaust gas 164 from the exhaust gas manifold 166 and combusts the exhaust gas 164 with combustor hydrogen 176 from the hydrogen supply 140. The combustion of the combustor hydrogen 176 with the exhaust gas 164 produces a high temperature/pressure turbine input gas 178. It should be noted that when the combustor 174 is not operating, the exhaust gas 164 travels through the combustor 174, resulting in the turbine input gas 178 being at the same pressure/temperature as the exhaust gas 164. In some examples, the turbocharger 154 can be bypassed using bypass valve 180.

A controller 182 is used to control the operation of the combustor 174. The controller 182 is a computer-based system that receives one or more inputs and, depending on the inputs, outputs one or more control signals to start, control, or stop the operation of the combustor 174. The controller 182 receives a load signal 184 from the electrical load 104. The load signal 184 is a signal that provides an indication to the controller 182 of the electrical load being placed on the system 100. Thus, the load signal 184 can indicate not only current being used, but also the types of loads, voltage drops when loads come online, and the like. Based on the load signal 184, the controller 182 determines if the combustor 174 is to be used. If the loading within a predetermined range, the controller 182 may determine that the combustor 174 is to be used or commenced. Thus, the controller 182 sends control valve signal 186 to combustor valve 188 to open or close the combustor valve 188. The controller 182 transmits the control valve signal 186 to open the combustor valve 188, thereby providing the combustor hydrogen 176 to the combustor 174. The controller 182 further transmits signal 190 to cause the combustor 174 to ignite, commencing the combustion of the combustor hydrogen 176 with the air (oxygen) from the exhaust gas 164, creating the high temperature/pressure turbine input gas 178 to rotate the blades of the turbine 168.

In some examples, the controller 182 can utilize other sources of hydrogen for the combustor hydrogen 176 than the hydrogen supply 140. For example, unused hydrogen in the anode exhaust manifold 145 can be used. As noted above, in some configurations, unused hydrogen moves from the fuel cells 102 into the anode exhaust manifold 145, whereby the excess hydrogen is fed back to the hydrogen supply 140. However, rather than feeding the excess hydrogen back to the hydrogen supply 140, the excess hydrogen can be used as the combustor hydrogen 176. In this configuration, the controller 182 transmits a hydrogen supply signal 185 to a hydrogen selector valve 187. The hydrogen selector valve 187 is a multiple input valve that, depending on the position of the valve, allows hydrogen from the hydrogen supply 140 to be fed as combustor hydrogen 176, excess hydrogen from the anode exhaust manifold 145 to be fed as the combustor hydrogen 176, no hydrogen to be fed as the combustor hydrogen 176, or a mixture of the hydrogen from the hydrogen supply 140 and the excess hydrogen from the anode exhaust manifold 145 to be fed as the combustor hydrogen 176.

The controller 182 can also be used to control other aspects of the system 100. For example, the controller 182 receives the load signal 184 and, based on the load, determines the amount of the hydrogen to be provided from the hydrogen supply 140. The controller 182 transmits ejector signal 194 to change the position of the hydrogen ejector 144, thus throttling the amount of the hydrogen from the hydrogen supply 140 fed to the fuel cells 102. In some configurations, the controller 182 can also modify the operation of the ebooster 172. Because the primary purpose of the ebooster 172 is to provide some degree of motive force, eboosters can be used in various configurations, illustrated by way of example in FIG. 2.

Figure 2:
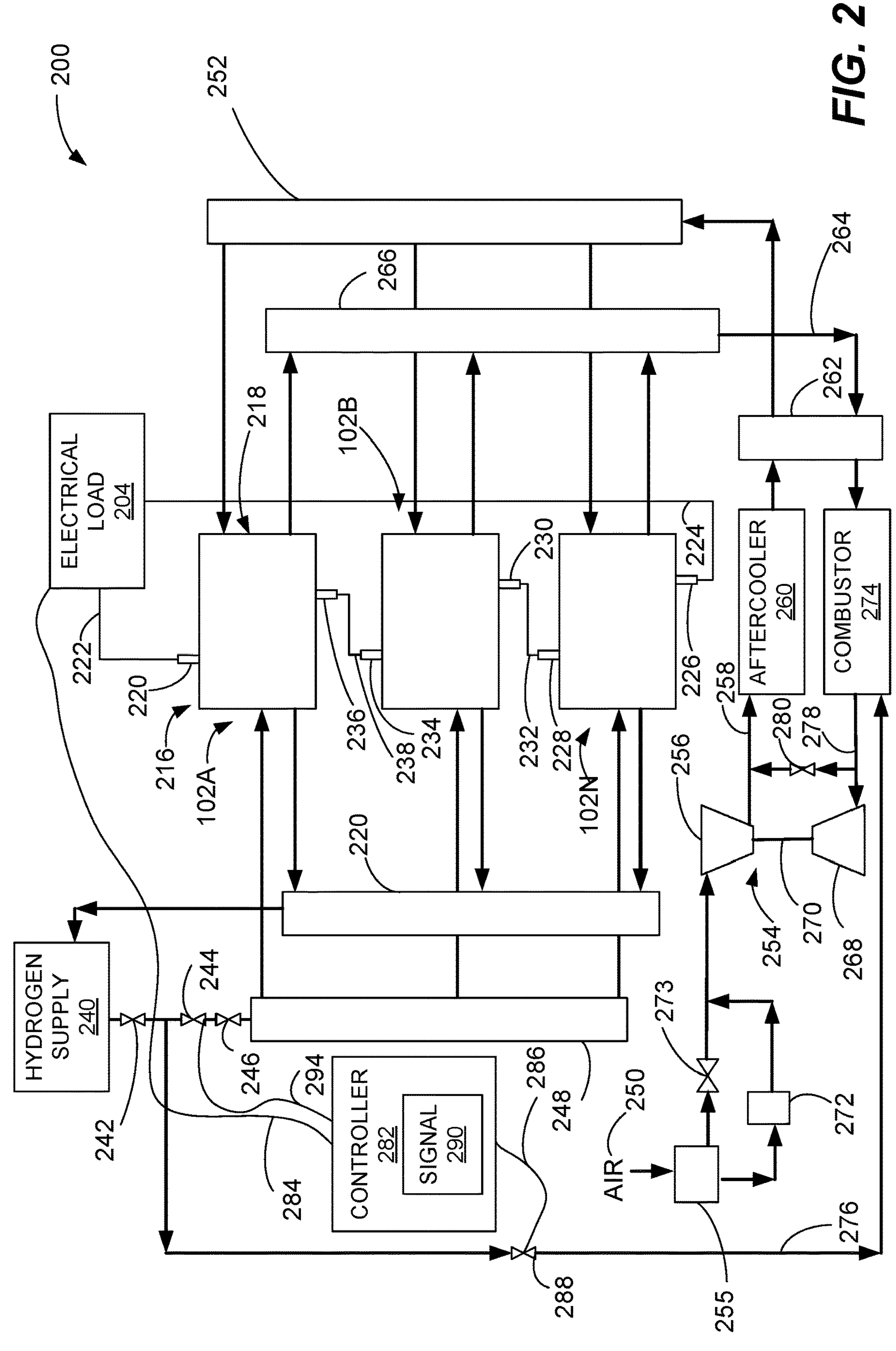
FIG. 2 illustrates an alternate fuel cell system using a combustor, in accordance with one or more examples of the presently disclosed subject matter.

FIG. 2 illustrates a fuel cell system 200 that uses an ebooster as a compressor, in accordance with one or more examples of the present disclosure. The fuel cell system 200 of FIG. 2 includes fuel cells 202A-202N (referred to hereinafter specifically as "the fuel cell 202A," "the fuel cell 202B," and the like, and generally as "the fuel cells 202"). The fuel cells 202 are used to produce electrical power for an electrical load 204. The electrical load 204 can be one or more components powered by electricity such as, but not limited to, motors for moving a vehicle, computers, air conditioners, screens, and the like. The presently disclosed subject matter is not limited to any particular type of electrical load 204. For the purposes of simplicity, the internal operations and components of the fuel cells 202 are similar in nature to the fuel cells 102 of FIG. 1, and thus, are not included in the description of FIG. 2.

The fuel cells 202 allow hydrogen ions (the protons) created on the anode side 216, and air (oxygen) on a cathode side 218 towards their respective catalysts, while blocking electrons, forcing the electrons to travel out anode 220, through connector 222 and into the electrical load 204. An electrical connector 224 is connected to the electrical load 204. To provide for an electrical circuit, the electrical connector 224 is electrically connected to a cathode 226 of the fuel cell 202N. An anode 228 of the fuel cell 102N is electrically connected to a cathode 230 of the fuel cell 202B through electrical connector 232. An anode 234 of the fuel cell 202B is electrically connected to a cathode 236 of the fuel cell 202A through electrical connector 238. In this manner, the fuel cells 202 are connected in series. It should be noted that the fuel cells 202 may be connected in other electrical configurations or combinations, all of which are included in the presently disclosed subject matter.

The fuel cells 202 are provided hydrogen from a hydrogen supply 240. The hydrogen from the hydrogen supply 240 moves through a hydrogen shutoff valve 242, a hydrogen ejector 244, a pressure regulator valve 246, and into a hydrogen intake manifold 248. The hydrogen shutoff valve 242, when closed, shuts off the hydrogen supply 240 from the system 200, typically in a shutdown or emergency mode. The hydrogen ejector 244 is a throttle valve that feeds the required quantity of hydrogen for the system 200 based on the electrical power needs of the electrical load 204. The pressure regulator valve 246 maintains a proper pressure in the hydrogen intake manifold 248 by increasing or decreasing the flow from the hydrogen ejector 244.

The fuel cells 202 are provided oxygen from air 250 in the air intake manifold 252. The air intake manifold 252 receives the air 250 through the use of a turbocharger 254. The turbocharger 254 receives the air 250 through a filter 255 that filters the air 250 of particulate prior to entering a compressor 256 of the turbocharger 254. The compressor 256 compresses the air 250 and provides compressed air 258 into an aftercooler 260. The aftercooler 260 cools the compressed air 258 to reduce the amount of heat added to the compressed air 258 after being compressed by the compressor 256. The compressed air 258 exits the aftercooler 260 and enters a humidifier 262. The humidifier 262 adds moisture to the cooled, compressed air 258 to increase the efficiency of the fuel cells 202. In FIG. 2, the humidifier 262 is designed to remove moister from an exhaust gas 264 coming from an exhaust gas manifold 266 of the fuel cells 202. It should be noted that moisture can be added in various ways than that which is illustrated in FIG. 2. Continuing with FIG. 2, the cooled, humidified, compressed air 258 leaves the humidifier 262 and enters the air intake manifold 252 for use by the fuel cells 202.

The exhaust gas 264 of the fuel cells 202 exits into the exhaust gas manifold 266. During steady-state or moderate loading from the electrical load 204, the pressure/temperature of the exhaust gas 264 can be high enough to move the blades (not shown) of a turbine 268 of the turbocharger 254. The spinning of the blades of the turbine 268 rotates a shaft 270 connecting the blades of the turbine 268 to compressor blades (not shown) of the compressor 256, thus providing the compression mechanism for the compressor 256 of the incoming air 250. However, in some configurations, such as startup or other low load conditions of the electrical load 204, the pressure/temperature of the exhaust gas 264 may not be high enough to provide the motive force necessary to turn the blades of the turbine 268 at a sufficient speed to cause a desired or needed compression of the air 250.

When the exhaust gas 264 is of insufficient temperature/pressure to provide the needed motive force upon the turbine 268, the system 200 may use an ebooster 272. An ebooster 272 is an electrically powered device that has an internal rotational mechanism that can be used to rotate components rotate an internal turbine (not shown). The ebooster 272, when energized, compresses the air 250 prior to the air entering the compressor 256 to provide an additional motive force to compress the air 250. The ebooster 272 can be bypassed using bypass valve 273. When the bypass valve 273 is opened, the air moves into the compressor 256 without being compressed by the ebooster 272.

In some configurations, a combustor 274 may be used to supplement or augment the motive force provided by the exhaust gas 264. Because the ebooster 272 is powered by the system 200 (i.e., is a parasitic load), in some instances, the use of the ebooster 272 can be efficient during startup or low load conditions, resulting in a lower efficiency during normal operations. In conditions where the use of the ebooster 272 is not desirable, the combustor 274 is used. The combustor 274 is a hydrogen internal combustion engine that combusts hydrogen with oxygen, forming high pressure/temperature exhaust, typically in the form of high-pressure steam, but other types of combustors with varying exhaust gases may be used. In FIG. 2, the combustor 274 receives the exhaust gas 264 from the exhaust gas manifold 266 and combusts the exhaust gas 264 with combustor hydrogen 276 from the hydrogen supply 240. The combustion of the combustor hydrogen 276 with the exhaust gas 264 produces a high temperature/pressure turbine input gas 278. It should be noted that when the combustor 274 is not operating, the exhaust gas 264 travels through the combustor 274, resulting in the turbine input gas 278 being at the same pressure/temperature as the exhaust gas 264. In some examples, the turbocharger 254 can be bypassed using bypass valve 280.

A controller 282 is used to control the operation of the combustor 274. The controller 282 is a computer-based system that receives one or more inputs and, depending on the inputs, outputs one or more control signals to start, control, or stop the operation of the combustor 274. The controller 282 receives load signal 284 from the electrical load 204. The load signal 284 is a signal that provides an indication to the controller 282 of the electrical load being placed on the system 200. Thus, the load signal 284 can indicate not only current being used, but also the types of loads, voltage drops when loads come online, and the like. Based on the load signal 284, the controller 282 determines if the combustor 274 is to be used. If the loading within a predetermined range, the controller 282 may determine that the combustor 274 is to be used or commenced. Thus, the controller 282 sends control valve signal 286 to combustor valve 288 to open or close the combustor valve 288. If the combustor 274 is to be used, the controller 282 transmits the control valve signal 286 to open the combustor valve 288, thereby providing the combustor hydrogen 276 to the combustor 274. The controller 282 further transmits signal 290 to cause the combustor 274 to ignite, commencing the combustion of the combustor hydrogen 276 with the air (oxygen) from the exhaust gas 264, creating the high temperature/pressure turbine input gas 278 to rotate the blades of the turbine 268.

The controller 282 can also be used to control other aspects of the system 200. For example, the controller 282 receives the load signal 284 and, based on the load, determines the amount of the hydrogen to be provided from the hydrogen supply 240. The controller 282 transmits ejector signal 294 to change the position of the hydrogen ejector 244, thus throttling the amount of the hydrogen from the hydrogen supply 240 fed to the fuel cells 202. In some configurations, the controller 282 can also modify the operation of the ebooster 272. The modification of the operation of the ebooster, such as the ebooster 172 of FIG. 1, or the ebooster 272 of FIG. 2, may be needed as the system powers up, shuts down, or changes an electrical output due to changing loading conditions of the electrical load 204, illustrated by way of example in FIG. 3.

Figure 3:
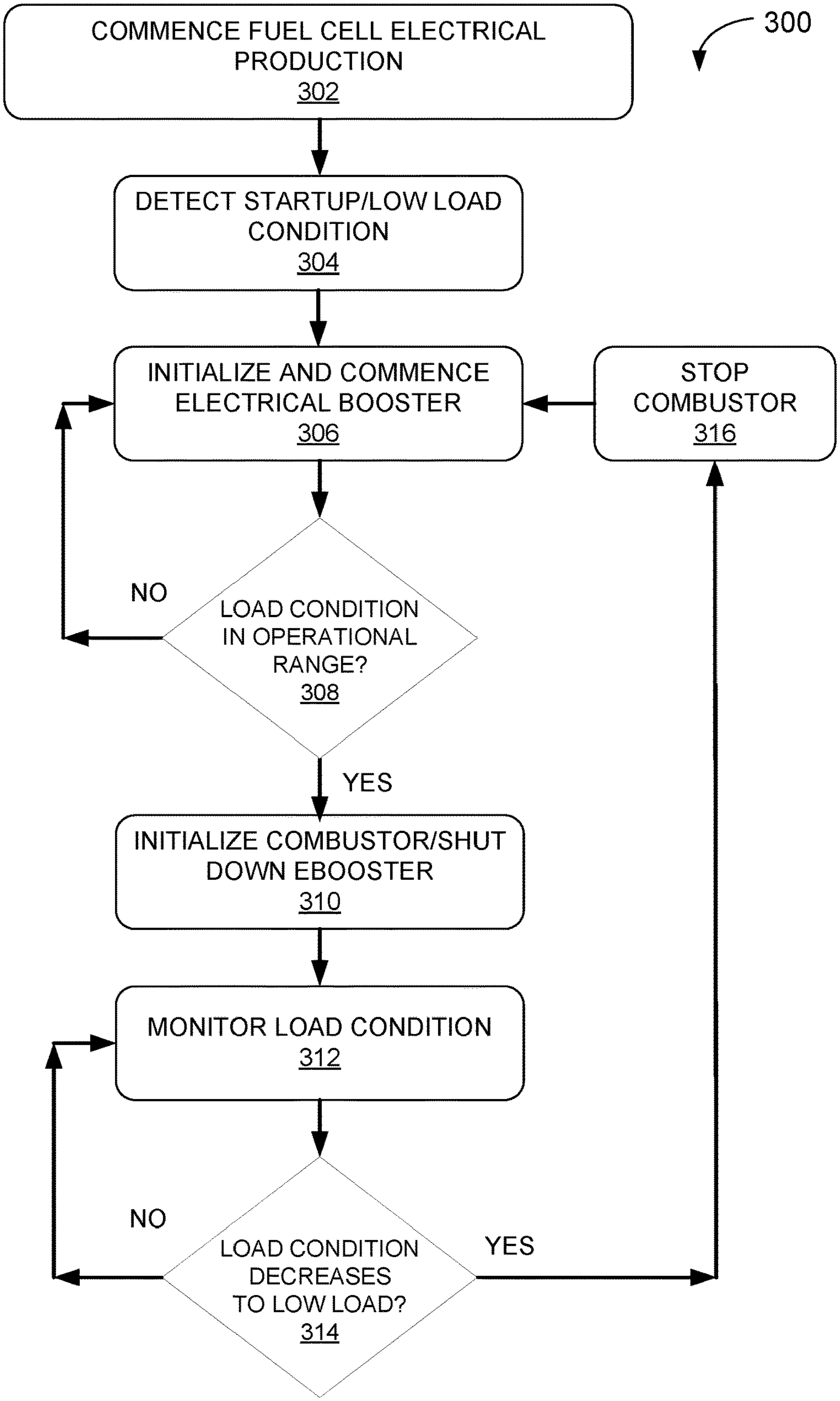
FIG. 3 illustrates a method for operating a fuel cell system with a combustor, in accordance with one or more examples of the present disclosure.

FIG. 3 illustrates a method 300 for operating a fuel cell system, such as the system 100 of FIG. 1 or the system 200 of FIG. 2, using a combustor, in accordance with various examples described herein. The method 300 and other processes described herein are illustrated as example flow graphs, each operation of which may represent a sequence of operations that can be implemented in hardware, software, or a combination thereof. In the context of software, the operations represent computer-executable instructions stored on one or more tangible computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

The method 300 commences at step 302, where the controller 182 commences fuel cell 102 electrical production. For example, in an automobile, this may occur when the system is energized by a battery (not shown), thereby ready to commence the production of electrical power.

At step 304, the controller 182 detects a startup/low load condition. A startup/low-load condition indicates that the exhaust gas 164 temperature/pressure may be insufficient to turn the turbine 168 of the turbocharger 154. As noted above, in various configurations, it may be desirable to compress the air 150 entering the intake manifold 152 to increase the efficiency of the system 100, or increase the power output of the system, or both. Thus, in a startup/low load condition, the controller 182 is programmed to use other sources of motive power to turn the compressor 156 of the turbocharger 154.

At step 306, the controller 182 initializes the ebooster 172. In FIG. 1, the ebooster 172 rotates the shaft 170 of the turbocharger 154, supplementing or augmenting the motive force provided by the exhaust gas 164. When energized, the ebooster 172 rotates the shaft 170, thereby rotating the blades of the compressor 156 to compress the air 150. In FIG. 2, the ebooster 272 compresses the air 250 prior to the air 250 entering the compressor 256, essentially acting as the compressor 256 until the turbine 268 can provide the motive force to turn the blades of the compressor 256.

At step 308, the controller 182 determines if the load condition of the electrical load 104 is within operational range of the combustor 174. As used herein, "operational range" means that the fuel cells 102 are providing enough power to the electrical load 104 that the exhaust gas 164 pressure/temperature is conducive to the operation of the combustor 174. In the operational range, the combustor 174 provides the motive force at a more efficient level than the ebooster 172. If at step 308 the controller 182 determines the load condition is not within operational range of the combustor 174, the method 300 continues to step 306 where the ebooster 172 operation is maintained.

At step 310, if the controller 182 at step 308 determines the load condition is in the operational range of the combustor 174, the controller initializes the combustor 174 and, if running, shuts down the ebooster 172. The controller 182 sends the control valve signal 186 to the combustor valve 188 to open the combustor valve 188. The controller 182 transmits the control valve signal 186 to open the combustor valve 188, thereby providing the combustor hydrogen 176 to the combustor 174. The controller 182 further transmits the signal 190 to cause the combustor 174 to ignite, commencing the combustion of the combustor hydrogen 176 with the air (oxygen) from the exhaust gas 164, creating the high temperature/pressure turbine input gas 178 to rotate the blades of the turbine 168.

At step 312, the controller 182 monitors the load condition of the electrical load 104. The controller 182 can use one or more indications to determine the load condition. For example, the controller 182 receives the load signal 184 that is an indication of the electrical load 104. In another example, the controller 182 can monitor the pressure of the exhaust gas 164, an indication of the operational level of the fuel cells 102.

At step 314, the controller 182 determines if the load condition has fallen below the operational level of the combustor 174. If at step 314 the controller 182 determines that the load level has not fallen below the operational level of the combustor 174, the controller 182 returns to step 312 and continues to monitor the load condition.

If at step 314 the controller 182 determines the load condition has decreased below the operational range, at step 316 the controller 182 stops the combustor 174. The controller 182 sends the control valve signal 186 to the combustor valve 188 to close the combustor valve 188, thereby removing the combustor hydrogen 176 from the combustor 174. The controller 182 further transmits the signal 190 to cause the combustor 174 to extinguish any ignition source, ceasing the combustion of the combustor hydrogen 176 with the air (oxygen) from the exhaust gas 164.

At step 306, the controller 182 commences the operation of the ebooster 172. The method continues while the system 100 is operational.

Figure 4:
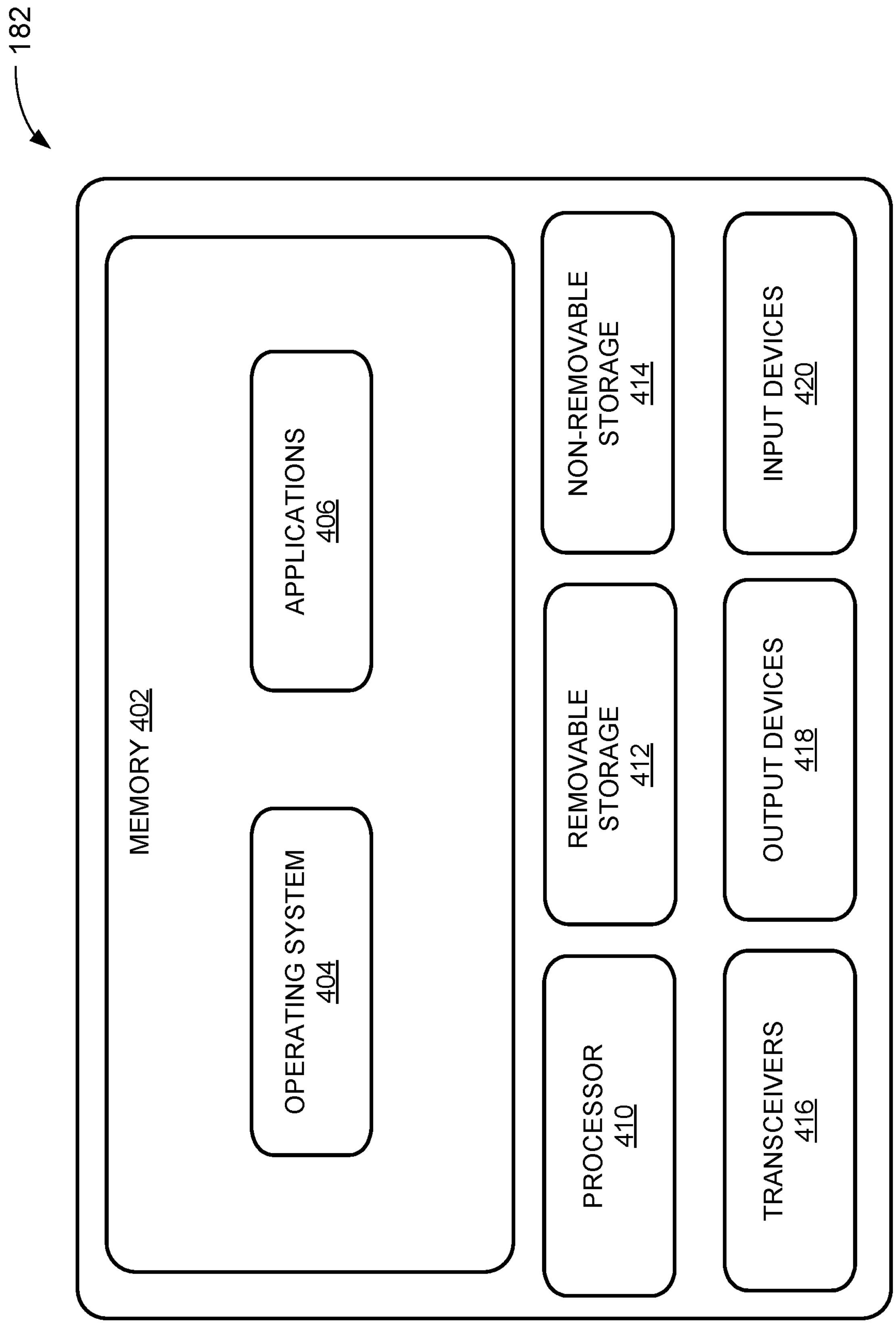
FIG. 4 depicts a component level view of a controller for controlling a combustor in a fuel cell system, in accordance with one or more examples of the present disclosure.

FIG. 4 depicts a component level view of the controller 182 for use with the systems and methods described herein. The controller 182 could be any device capable of providing the functionality associated with the systems and methods described herein. controller 182 can comprise several components to execute the above-mentioned functions. The controller 182 may be comprised of hardware, software, or various combinations thereof. As discussed below, the controller 182 can comprise memory 402 including an operating system (OS) 404 and one or more standard applications 406. The standard applications 406 may include applications that provide for receiving and determining load conditions of the electrical load 104 to implement the method 300 of FIG. 3.

The controller 182 can also comprise one or more processors 410 and one or more of removable storage 412, non-removable storage 414, transceiver(s) 416, output device(s) 418, and input device(s) 420. In various implementations, the memory 402 can be volatile (such as random access memory (RAM)), non-volatile (such as read only memory (ROM), flash memory, etc.), or some combination of the two. The memory 402 can include data pertaining to operational ranges of combustors, hydrogen flows, and other information, and can be stored on a remote server or a cloud of servers accessible by the controller 182.

The memory 402 can also include the OS 404. The OS 404 varies depending on the manufacturer of the controller 182. The OS 404 contains the modules and software that support basic functions of the controller 182, such as scheduling tasks, executing applications, and controlling peripherals. The OS 404 can also enable the controller 182 to send and retrieve other data and perform other functions, such as transmitting control signals using the transceivers 416 and/or output devices 418, and, receiving load conditions using the input devices 420.

The controller 182 can also comprise one or more processors 410. In some implementations, the processor(s) 410 can be one or more central processing units (CPUs), graphics processing units (GPUs), both CPU and GPU, or any other combinations and numbers of processing units. The controller 182 may also include additional data storage devices (removable and/or non-removable) such as, for example, magnetic disks, optical disks, or tape. Such additional storage is illustrated in FIG. 4 by removable storage 412 and non-removable storage 414.

Non-transitory computer-readable media may include volatile and nonvolatile, removable and non-removable tangible, physical media implemented in technology for storage of information, such as computer readable instructions, data structures, program modules, or other data. The memory 402, removable storage 412, and non-removable storage 414 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information, which can be accessed by the controller 182. Any such non-transitory computer-readable media may be part of the controller 182 or may be a separate database, databank, remote server, or cloud-based server.

In some implementations, the transceiver(s) 416 include any transceivers known in the art. In some examples, the transceiver(s) 416 can include wireless modem(s) to facilitate wireless connectivity with other components (e.g., between the controller 182 and a wireless modem that is a gateway to the Internet), the Internet, and/or an intranet. Specifically, the transceiver(s) 416 can include one or more transceivers that can enable the controller 182 to send and receive data. Thus, the transceiver(s) 416 can include multiple single-channel transceivers or a multi-frequency, multi-channel transceiver to enable the controller 182 to send and receive video calls, audio calls, messaging, etc. The transceiver(s) 416 can enable the controller 182 to connect to multiple networks including, but not limited to 2G, 3G, 4G, 5G, and Wi-Fi networks. The transceiver(s) 416 can also include one or more transceivers to enable the controller 182 to connect to future (e.g., 6G) networks, Internet-of-Things (IoT), machine-to machine (M2M), and other current and future networks.

The transceiver(s) 416 may also include one or more radio transceivers that perform the function of transmitting and receiving radio frequency communications via an antenna (e.g., Wi-Fi or Bluetooth®). In other examples, the transceiver(s) 416 may include wired communication components, such as a wired modem or Ethernet port, for communicating via one or more wired networks. The transceiver(s) 416 can enable the controller 182 to facilitate audio and video calls, download files, access web applications, and provide other communications associated with the systems and methods, described above.

In some implementations, the output device(s) 418 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen or display. The output device(s) 418 can also include speakers, or similar devices, to play sounds or ringtones when an audio call or video call is received. Output device(s) 418 can also include ports for one or more peripheral devices, such as headphones, peripheral speakers, or a peripheral display.

In various implementations, input device(s) 420 include any input devices known in the art. For example, the input device(s) 420 may include a camera, a microphone, or a keyboard/keypad. The input device(s) 420 can include a touch-sensitive display or a keyboard to enable users to enter data and make requests and receive responses via web applications (e.g., in a web browser), make audio and video calls, and use the standard applications 406, among other things. A touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. A touch sensitive display can act as both an input device 420 and an output device 418.

INDUSTRIAL APPLICABILITY

The present disclosure relates generally to hydrogen fuel cell systems that user a combustor to increase the motive force of an exhaust gas of a fuel cell stack of the fuel cell system. During some conditions, the exhaust gases coming from the fuel cell stack are at or near ambient temperature and pressure. In systems that use a turbocharger to compress incoming air to increase the power or efficiency of the fuel cell system, the benefits of an exhaust gas at those temperatures and pressures are nominal at best. To overcome this deficiency, especially in light loads and startup conditions, some systems use an electrical booster (ebooster). The ebooster is an electrically powered motor that can spin the shaft of the turbocharger or compress the incoming air, thereby compensating at least in part of the lack of motive force available when exhaust gases are at or near ambient temperature and pressure.

However, the use of these eboosters can be limiting in some examples. For example, the capacity of the ebooster to compensate for the low motive force of the exhaust gas must be relatively high. Because the ebooster is typically powered from the fuel cell system, the ebooster can quickly become a large parasitic load, whereby at certain power levels, the benefits of the ebooster can have diminishing returns. Rather than taxing the fuel cell system, examples of the presently disclosed subject matter use a combustor. The combustor receives hydrogen from a hydrogen source and combusts that hydrogen with oxygen in the exhaust gases. The combustion increases the pressure and temperature of the exhaust gases from the ambient level to a higher pressure and temperature more suitable for use by the turbine of the turbocharger. The combustor is not a parasitic load on the hydrogen fuel cell system and, because the pressure/temperature mechanism is combustion, the combustor can be used over a greater range of power levels, thereby reducing the need (and required size) of eboosters in the fuel cell system.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A fuel cell system, the system comprising:

one or more hydrogen fuel cells electrically connected to an electrical load, wherein the hydrogen fuel cells are configured to provide electrical power to the electrical load;

a turbocharger comprising a compressor and a turbine, wherein the compressor is configured to compress air into compressed air, and the turbine is configured to rotate the compressor to compress the air;

an air intake manifold configured to receive the compressed air and introduce the compressed air into a cathode side of the one or more hydrogen fuel cells;

a hydrogen intake manifold configured to receive hydrogen from a hydrogen supply and supply the hydrogen to an anode side of the one or more hydrogen fuel cells;

an exhaust manifold configured to receive exhaust gases, at a first temperature and a first pressure, from the cathode side of the one or more hydrogen fuel cells; and a combustor configured to generate a turbine input gas having at a second pressure greater than the first pressure and a second temperature greater than the first pressure and the first temperature by:

receiving the exhaust gases from the exhaust manifold;

receiving combustor hydrogen from the hydrogen supply; and combusting the exhaust gases with the combustor hydrogen, wherein the turbine input gas is fed to the turbine to rotate a shaft connecting the turbine to the compressor.

2. The fuel cell system of claim 1, wherein the combustor comprises a hydrogen internal combustion engine configured to combust hydrogen with oxygen in the exhaust gases.

3. The fuel cell system of claim 1, further comprising a controller configured to:

receive a load signal indicating the electrical load;

determine, based on the load signal, that the electrical load is within a predetermined range; and based on determining that the electrical load is within the predetermined range, transmit a control valve signal to open a combustor valve to allow a flow of hydrogen to the combustor, and transmit a signal to cause the combustor to ignite to commence combustion of the hydrogen with oxygen in the exhaust gases.

4. The fuel cell system of claim 3, wherein the controller is further configured to:

determine, based on the load signal, that the electrical load is below the predetermined range;

transmit the control valve signal to close the combustor valve to block the flow of hydrogen to the combustor; and cause a transmission of the signal to the combustor to extinguish combustion of the hydrogen with the oxygen in the exhaust gases.

5. The fuel cell system of claim 1, further comprising an ebooster operably connected to the shaft, wherein when the ebooster is energized, the ebooster rotates the shaft.

6. The fuel cell system of claim 1, further comprising an ebooster fluidly connected to an intake of the compressor and configured to:

receive intake air;

compress the intake air into compressed air; and provide the compressed air to the compressor.

7. The fuel cell system of claim 1, further comprising an aftercooler configured to reduce a temperature of the compressed air from the compressor.

8. The fuel cell system of claim 1, further comprising a humidifier configured to add moisture to the compressed air from the compressor.

9. The fuel cell system of claim 8, wherein the humidifier is further configured to remove moisture from the exhaust gases.

* * * * *